H. Molby.
Corn-Harvester.
N° 73629. Patented Jan. 21, 1868
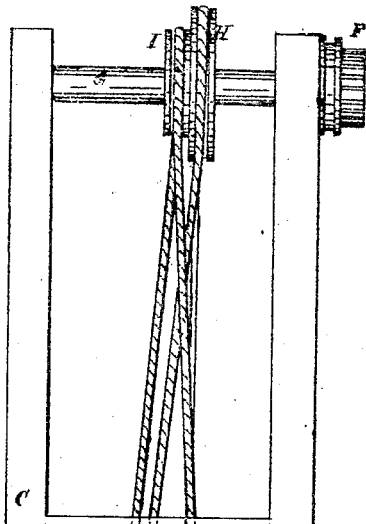
Fig. 3.
Fig. 4.
Fig. 5.
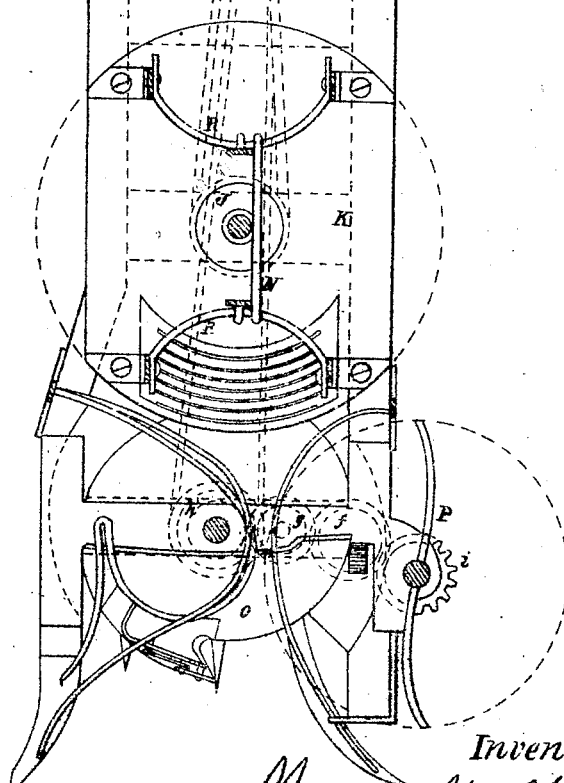
Witnesses.
Inventor.
Horace Molby
per
Alexander Dueason
atty

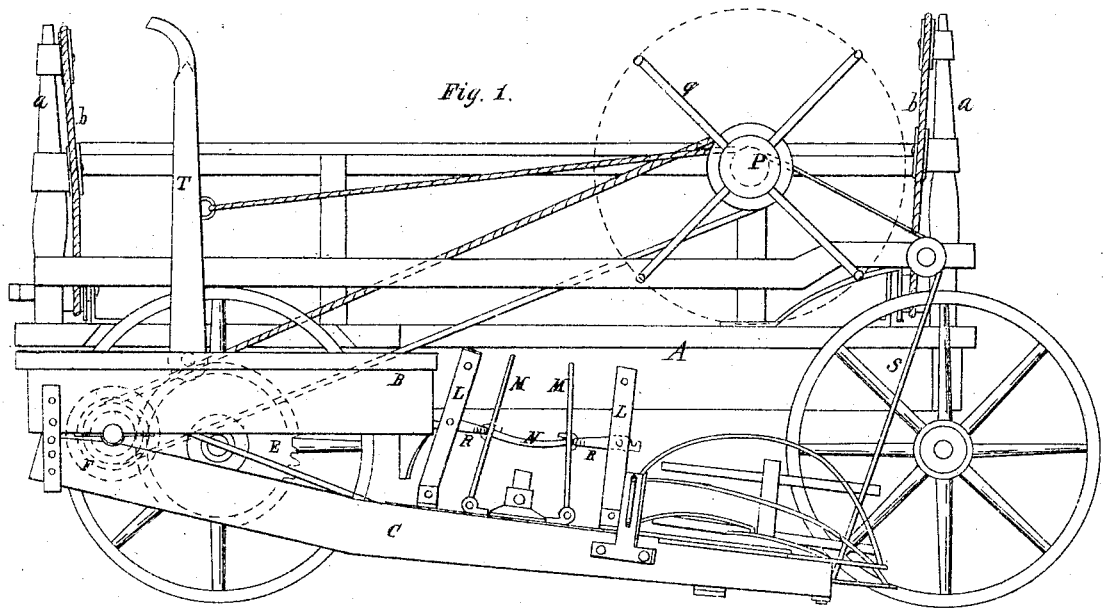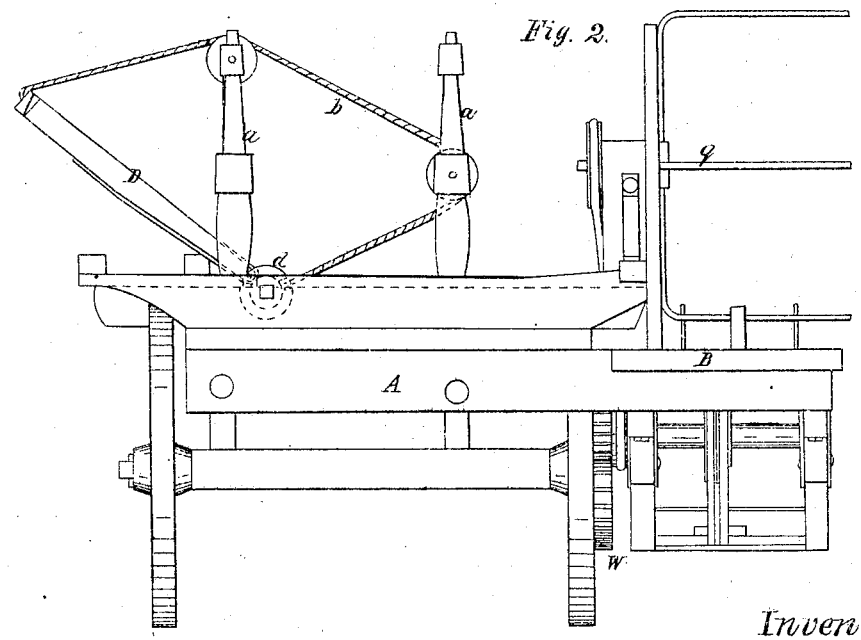

United States Patent Office.

HORACE MOLBY, OF DAVISBURG, MICHIGAN.

Letters Patent No. 73,629 dated January 21, 1868.

IMPROVEMENT IN CORN-HARVESTERS.

The Schedule referred to in these Letters Patent and making part of the same.

TO ALL WHOM IT MAY CONCERN:

Be it known that I, HORACE MOLBY, of Davisburg, in the county of Oakland, and State of Michigan, have invented certain new and useful Improvements in Corn-Harvesters; and I do hereby declare that the following is a full, clear, and exact description of the same, reference being had to the accompanying drawings, and to the letters of reference marked thereon.

In the annexed drawings, making part of this specification, A represents the frame of this machine, which is made similar to an ordinary skeleton wagon-body, and is supported upon suitable wheels and axles. Erected upon this frame are four standards, $a\ a$, which are provided each with a pulley, over which pass the cords $b\ b$. Two of these standards are at one end and two at the other. A rack, D, lies longitudinally of the frame, and is hinged to it at its lower edge. The cords $b\ b$ have one end attached to the upper ends of the rack, while their lower ends are secured to the small windlasses $d\ d$. These cords pass around the pulleys on the standards, and serve to move the upper end of the rack to one side or the other, for loading and unloading the corn.

On one side of the frame A is situated a platform, B, upon which the operator stands in manipulating the machine and the corn after it has been cut. Beneath the platform B, and to the rear of the frame at one side, is hinged the hinged frame C, to which is secured the cutting-apparatus. T represents a lever-handle, which is secured at its lower end to platform B, and from this handle passes a cord, $s$, over a pulley on the forward end of the machine, and attaches to the forward end of the hinged frame C. This handle and cord serve to raise and lower the forward end of the hinged frame.

G represents a shaft, which lies across the rear of the hinged frame, having its bearings in it. This shaft is provided with a pinion, F, and two pulleys, I and H. A gear-wheel, $w$, which is secured to one of the faces of one of the supporting-wheels of the machine, takes into the teeth of pinion F and gives motion to shaft G.

O represents the cutter-wheel, which is placed in a horizontal position upon the forward end of the hinged frame. The shaft of this cutter-wheel has upon its lower end a pinion, and just above this pinion, a pulley, as seen in dotted lines, Figure 3. A band from pulley $h$ passes to and around pulley H on shaft G, and by means of this band is the cutter-wheel driven. Two idle-wheels, $g$ and $f$, convey motion from the pinion on the cutter-wheel shaft to the pinion $i$ on the shaft of the reel P.

Upon the periphery of the wheel O are two crooked knives, which cut the stalks of corn when the wheel revolves. Attached to the knife or cutter-wheel are the fingers with elbows, which drop in a slot in the wheel as they pass under the apron, (which partially covers the wheel,) but rise up again as they come out, and serve to carry the corn from right to left within reach of the reel P.

Back of the apron, and upon the hinged frame, is placed a revolving platform, K. The shaft of this platform, standing in a vertical position, has on its lower end a pulley, J, which is connected to pulley I on shaft G by means of a band. Upon the upper side of this platform are hinged four standards, L L, two at one end, at a suitable distance apart, and two at the other end. These standards are connected in pairs, as seen, by the curved bars R R, and the bars R are connected by means of the rod N. The bottom of the platform is corrugated or roughened, to keep the bottoms of the stalks from slipping.

In using this machine, it is drawn forward, so that the knives of the circular cutter pass over the rc corn. The wheel O, having motion imparted to it through the band of pulley H on shaft G, its knives cut stalks of corn and its fingers carry the butts back, so that the stalks are caught by the reel P. The reel P moves the stalks backward, and stands them upon the platform K and resting against one of the curved bars R. As soon as a sufficient number of stalks is cut and carried back to make a bundle, the operator tightens the cord on pulley I, which acts on the pulley J on the shaft of the platform K, and causes said platform to make a half revolution, or the operator may turn at once the revolving platform by hand. The operator then, after tying the bundle, throws it upon the rack D, where it remains until a load has been cut. As soon as this happens, a wagon is brought by the side of the machine, and, by the cords $b\ b$, the rack is partially revolved, and the stalks thrown on to the wagon, which carries them away. Thus, the operation continues, and as fast as a bundle of stalks is made or collected upon the platform K, so often is it partially revolved and they removed. The large reel $g$ serves to carry back the tops of the stalks to the revolving platform, while the reel P moves the butts.

Having thus fully described my invention, what I claim as new, and desire to secure by Letters Patent, is—

1. In combination with the frame A, provided with the rack D and cords $d\ d$ and standards $a\ a$, the hinged frame C, rotary cutter, cord $s$, and lever T, arranged in the manner and for the purposes set forth.

2. The revolving platform K, with its bars L L and R, for supporting the cornstalks, and operating as and for the purpose specified.

3. The arrangement of the cutter-wheel O with the revolving platform K and the reels P and $q$, substantially as and for the purpose specified.

As evidence that I claim the foregoing, I have hereunto set my hand in the presence of two witnesses.

HORACE MOLBY.

Witnesses:
B. HENRY ROTHWELL,
GEORGE M. LYON.